Aug. 26, 1969 J. J. ROSSMAN ET AL 3,463,044

HYDRAULIC HOLDING DEVICES

Filed May 5, 1967 2 Sheets-Sheet 1

INVENTORS
JOSEPH J. ROSSMAN
EUGENE HUDGINS

BY Albert J. Kramer
ATTORNEY

HYDRAULIC HOLDING DEVICES

Filed May 5, 1967 2 Sheets-Sheet 2

INVENTORS
JOSEPH J. ROSSMAN
EUGENE HUDGINS

BY Albert J. Kramer
ATTORNEY

United States Patent Office 3,463,044
Patented Aug. 26, 1969

3,463,044

HYDRAULIC HOLDING DEVICES

Joseph J. Rossman and Eugene Hudgins, both % Jerry Tools, Inc., 6200 Vine St., Cincinnati, Ohio 45216

Filed May 5, 1967, Ser. No. 636,447
Int. Cl. F16b 33/00, 37/00, 43/00
U.S. Cl. 85—9 10 Claims

ABSTRACT OF THE DISCLOSURE

A hydraulic nut, a hydraulic bolt and a hydraulic washer are provided consisting each of a body, an annular groove on one end of the body and a thrust ring in the groove. The groove between the ring and the body is filled with hydraulic fluid. Each has an inlet duct leading from the groove which terminates with a grease (Alemite) fitting through which grease from an ordinary grease applicator is inserted. A fluid outlet duct leads from the groove and is provided with a valve for selectively withdrawing fluid from the groove. The washer is devoid of the fitting and is provided only with a pair of diametrically opposite ducts with removable plugs.

This invention relates to holding devices, such as nuts, bolts and washers, and it is more particularly concerned with such holding devices which function on a hydraulic principle.

An object of the invention is the provision of a hydraulic holding device, each of which is a self-contained unit.

Another object of the invention is the provision of a holding device which operates on a hydraulic principle with the embodiment of a minimum of hydraulic elements.

A further object is the provision of a hydraulic holding device having valve means through which a quantity of hydraulic fluid may be inserted from an exterior source and from which hydraulic fluid may be selectively withdrawn.

A still further object of the invention is the provision of a hydraulic device of the type mentioned which contains a predetermined quantity of hydraulic fluid and which functions to equalize unit area forces acting thereon.

These and still further objects, features and advantages of the invention will appear more fully from the following description considered together with the accompanying drawing.

Figure 1:
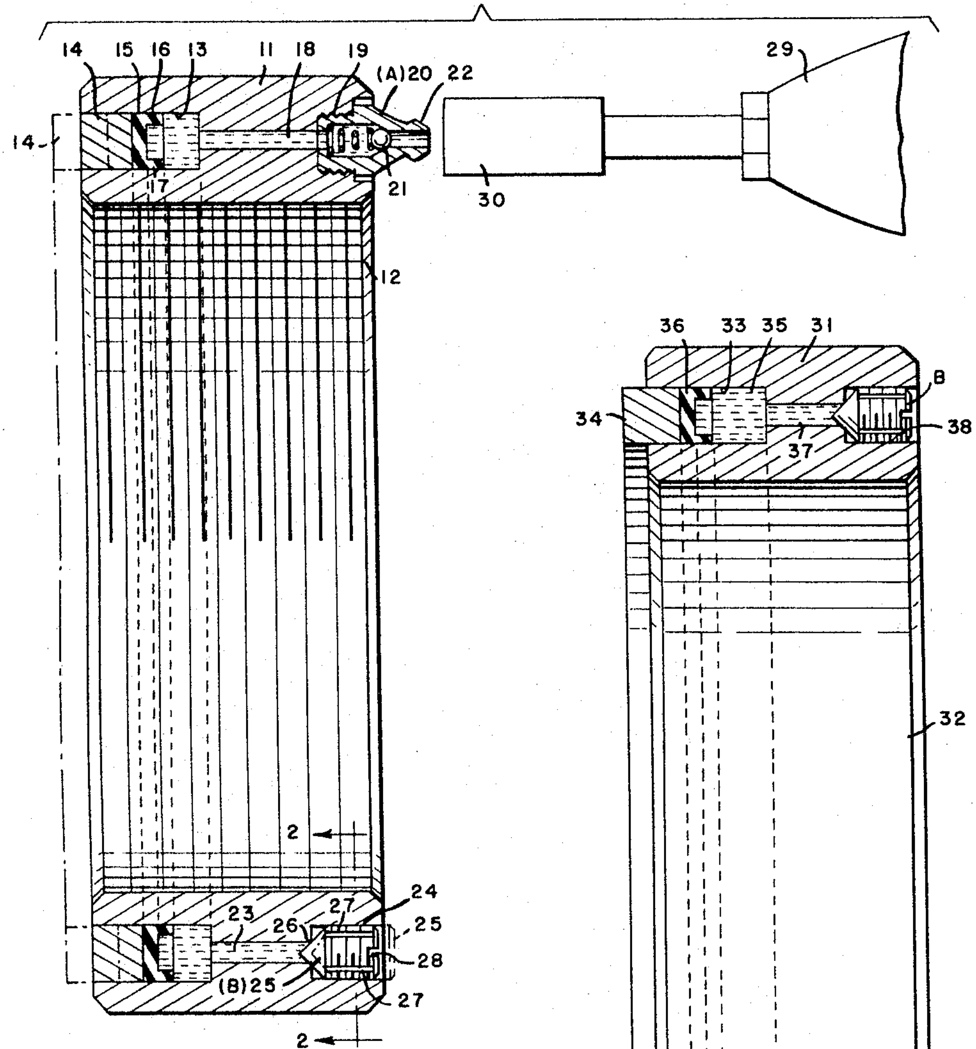
FIG. 1 is a longitudinal sectional view of an embodiment of a nut in accordance with this invention.
Figure 2:
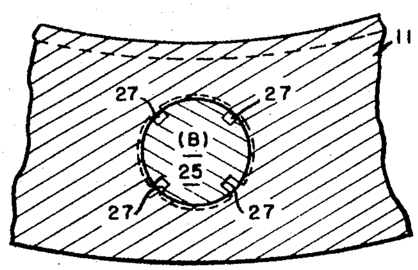
FIG. 2 is a sectional view along the line 2—2 of FIG. 1 on a larger scale.

Referring with more particularity to the drawing, the embodiment illustrated in FIGS. 1 and 2 comprises a nut body 11 having a central threaded aperture 12. On one end of the body 11 there is provided a relatively deep annular concentric groove 13 adapted to contain a thrust ring 14 and a flanged annular fluid sealing ring 15 of rubber, neoprene, or other suitable flexible material. The flanges 16 and 17 extend inwardly along the sides of the groove in direct contact with the hydraulic fluid.

An inlet duct 18 extends from the bottom of the groove 13 to the opposite end of the nut body. A threaded enlargement 19 is provided at the outer end of the duct 18 to receive a conventional grease fitting 20, such as an Alemite fitting, which contains a ball check valve 21 and a mating nipple 22, hereinafter referred to as an A unit.

An outlet duct 23 is provided, in addition to the duct 18, extending from the bottom of the groove 13 to the opposite end of the nut body 11. A threaded enlargement 24 is provided at the outer end of the duct 23 to threadedly receive a plug 25. The inner end of the plug 25 has a conical face 26 which is adapted to enter and close the duct 23 in its inner position. Drain channels 27 (four shown) are provided along the surface of the plug 25. The plug 25 is also provided with a tool grip, such as a screwdriver slot 28. These means are hereinafter referred to as a B unit.

The embodiment just described is used by placing the body 11 on a threaded shank such as of a bolt (not shown) moving it to a position of abutment against a member (not shown) to which it is to be applied. Then, a grease applicator 29 of any conventional type having an end socket 30 is applied to the nipple 22 of the fitting 20 and grease under pressure is allowed to enter the groove 13 through the duct 18. This produces a hydraulic pressure behind the thrust ring 14 in accordance with the principles of hydraulics generally known in the art.

The nut will remain in this extended position indefinitely. When it is desired to remove the nut the hydraulic pressure is released by unseating the plug 25 from the outer end of the duct 23 whereupon fluid escapes through the channels 27 to the exterior.

The nut can be reused by again seating the plug 25 in the end of the duct 23 and reapplying fluid pressure from the applicator 29 to the fitting 20.

Figure 3:
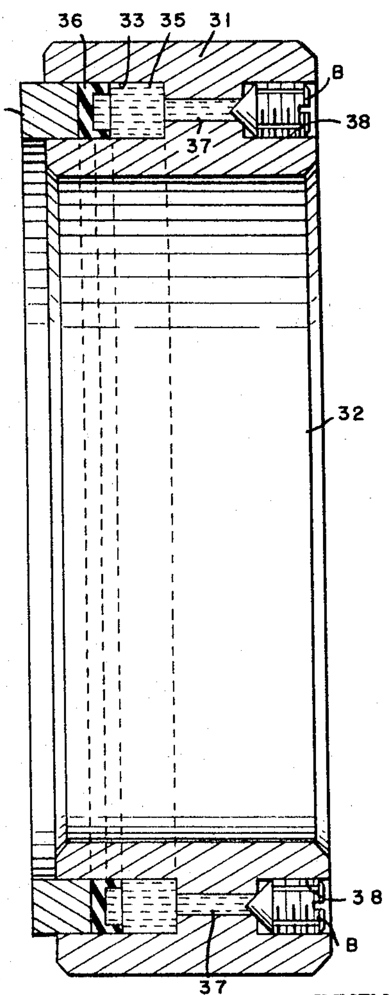
FIG. 3 is a longitudinal sectional view of an embodiment of a washer in accordance with this invention.

The second embodiment of the invention illustrated in FIG. 3 of a washer comprises a body 31 having a central smooth bore 32. A concentric relatively deep annular groove 33 is provided on one end of the body 31. A thrust ring 34 is disposed in the groove 33 and it normally projects outwardly a substantial distance beyond the end of the body 31. Within the groove 33 there is disposed a liquid 35 and a liquid sealing ring 36 similar to the ring 15 adjacent the inner end of the thrust ring 34.

Ducts 37, 37 are provided at diametrically opposite sides and extend from the groove 33. These ducts are similar to the duct 23 containing similar threaded enlargements, 38, 38 and units B, respectively.

The volume of liquid in the groove 33 is adjusted to hold the thrust ring 34 in an extended position. In accordance with well known hydraulic principles, there will result an equalization of unit area forces between the outer face of the thrust ring 34 and the opposite end of the body 31 when axial compressional pressure is applied between opposite ends of the washer.

Figure 4:
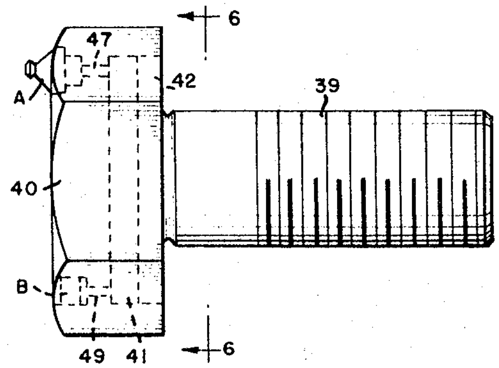
FIG. 4 is an elevational view of a hydraulic bolt in accordance with this invention.
Figure 5:
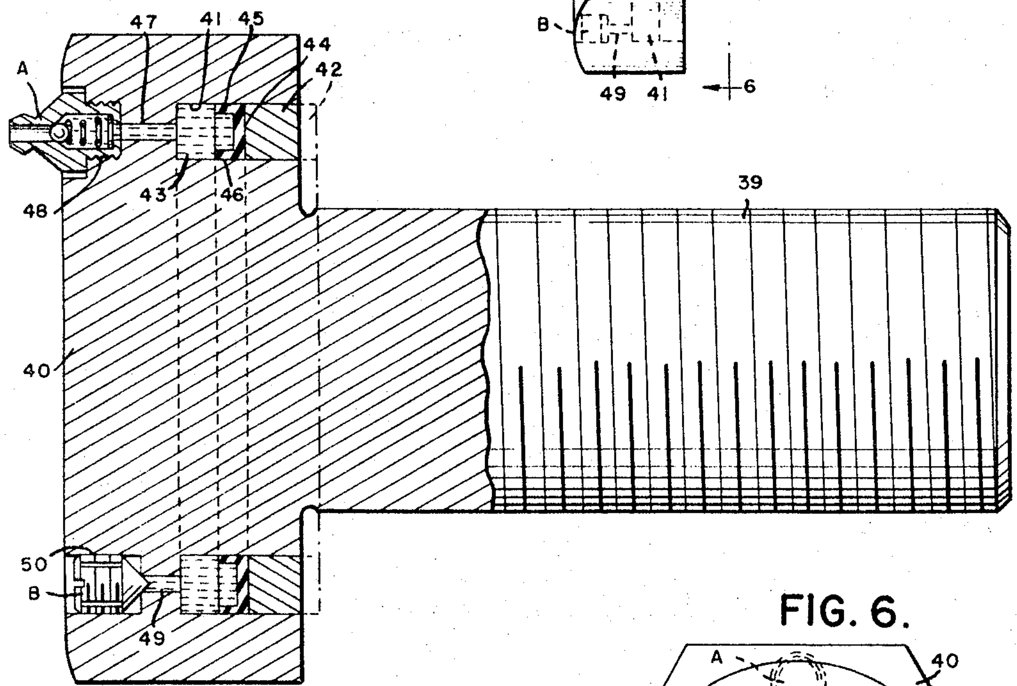
FIG. 5 is a longitudinal sectional view of the embodiment of FIG. 4 on a larger scale.
Figure 6:
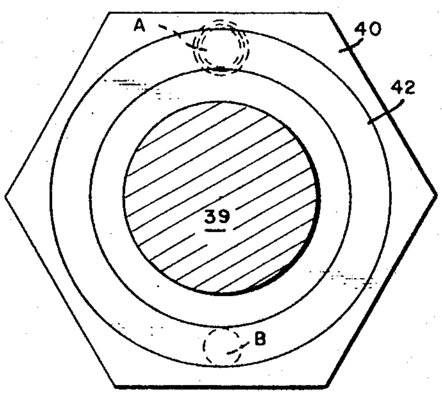
FIG. 6 is a sectional view along the lines 6—6 of FIG. 4.

The embodiment illustrated in FIGS. 4, 5 and 6 comprises a body in the form of a bolt having a threaded shank 39 and a flanged head 40 at one end.

A groove 41 is provided on the inner side of the head 40 concentric with the shank 39 and with the groove 41 in which there is disposed for axial movement a thrust ring 42. The groove 41 is adapted to contain a continuous hydraulic fluid 43 and an annular flanged seal 44 of a suitable flexible material which is disposed adjacent the thrust ring 42 with the flanges 45 and 46 extending inwardly into direct contact with the hydraulic fluid 43.

An inlet duct 47 extends outwardly from the groove and it is provided with a threaded enlargement 48 to receive a unit A.

An outlet duct 49 similar to the duct 23 is also provided diametrically opposite the inlet duct 47 extending from the groove 41. This outlet duct is similarly provided with an enlarged threaded outer end 50 for the reception of a unit B.

Figure 7:
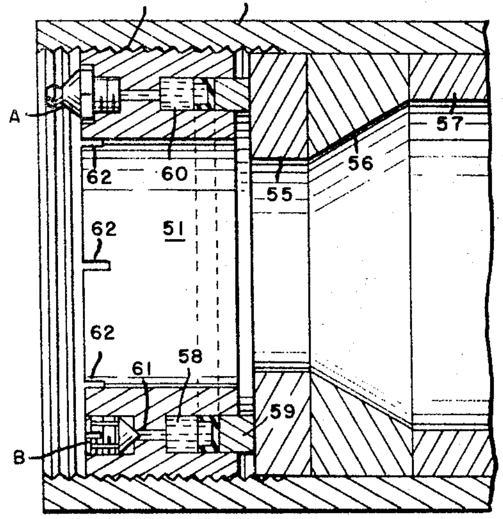
FIG. 7 is a longitudinal sectional view of another embodiment of the invention for use in providing internal assemblage.

The embodiment illustrated in FIG. 7 is similar to the other embodiment except that the body 51 is in the form of a ring having external threads 52 for engaging the internal threads of a tubular member 54 in which it is desired to assemble parts, such as the members 55, 56 and 57 which are representative of many different types of members, such as bushings, rings, etc.

In this embodiment a similar groove 58 is provided with a thrust ring 59, a similar outlet duct 60 with a unit A and an outlet duct 61 with a unit B. The body 51 may be provided with internal configurations, such as slits 62 as tool grips for setting it in place before the hydraulic pressure is applied.

A further modification comprises threading the inner annular surface of the body member 32 of FIG. 3 for use in situations where a selected position is desired of the body member on a threaded shank.

We claim:

1. A device of the character described comprising a body member having on one end a relatively deep groove, a thrust ring slidably movable in said groove, a liquid filling between said thrust ring and groove, means sealing said thrust ring with said groove against the escape of liquid from the groove, a pair of diametrically opposite ducts in said body extending from the groove to the exterior, one duct having valve means for selectively controlling the flow of liquid thereinto from a source exterior of the body member, said valve including means to receive a disconnectable applicator from the exterior source, the other duct having valve means for selectively controlling the flow of liquid therefrom to the exterior of the body member.

2. A device as defined by claim 1 in which the axial bore is smooth and the thrust ring is normally in a protracted position.

3. A device as defined by claim 1 in which the axial bore is threaded and the thrust ring is adapted to retract within the groove.

4. A device as defined by claim 3 in which the valve means of said one duct comprises a check valve through which liquid from an exterior source may be inserted.

5. A device as defined by claim 4 in which the duct containing the check valve is provided with a nipple for cooperative mating with a conventional grease applicator.

6. A device as defined by claim 1 in which the valve means of said other duct comprises a removable plug for selectively arresting and releasing the flow of liquid from the duct.

7. A device as defined by claim 6 in which the plug comprises a member having an enlarged cylindrical portion and a conical nose adapted to engage and disengage the end of the duct.

8. A device as defined by claim 7 in which the end of the duct is enlarged to receive the cylindrical portion of the member, and the enlarged cylindrical portion is provided with a drainage channel to permit passage of fluid from the duct on disengagement of the conical nose therefrom.

9. A device as defined by claim 1 in which the body member comprises a bolt having a threaded shank and a flanged head at one end of the shank, said groove being coaxially disposed in said head on the inner side thereof.

10. A device as defined by claim 1 in which the body member comprises a cylindrical member having threads on the exterior lateral surface thereof, said cylindrical member having means for engaging a rotary tool.

References Cited

UNITED STATES PATENTS

| | | | |
|---|---|---|---|
| 2,018,506 | 10/1935 | Walker. | |
| 2,974,724 | 3/1961 | Levin | 251—216 |
| 3,154,006 | 10/1964 | Novak | 85—32 |
| 3,301,297 | 1/1967 | Burr | 85—32 |
| 3,033,597 | 5/1962 | Miller | 85—32 |
| 2.620.160 | 12/1952 | Ray | 254—93 |

FOREIGN PATENTS

| | | |
|---|---|---|
| 908,360 | 10/1962 | Great Britain. |
| 991,783 | 5/1965 | Great Britain. |

EDWARD C. ALLEN, Primary Examiner

U.S. Cl. X.R.

85—32, 50